United States Patent
Chen et al.

(10) Patent No.: US 9,627,149 B2
(45) Date of Patent: Apr. 18, 2017

(54) SOLID ELECTROLYTIC CHIP CAPACITOR AND MANUFACTURING METHOD THEREOF

(71) Applicant: APAQ TECHNOLOGY CO., LTD., Miaoli County (TW)

(72) Inventors: Ming-Tsung Chen, Changhua County (TW); Yi-Ying Wang, Hsinchu (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 29 days.

(21) Appl. No.: 14/886,153

(22) Filed: Oct. 19, 2015

(65) Prior Publication Data

US 2016/0118194 A1    Apr. 28, 2016

(30) Foreign Application Priority Data

Oct. 28, 2014   (TW) .............................. 103137174 A

(51) Int. Cl.
| | | |
|---|---|---|
| *H01G 9/15* | (2006.01) | |
| *H01G 9/00* | (2006.01) | |
| *H01G 9/04* | (2006.01) | |
| *H01G 9/048* | (2006.01) | |
| *H01G 9/042* | (2006.01) | |

(52) U.S. Cl.
CPC ............. *H01G 9/15* (2013.01); *H01G 9/0029* (2013.01); *H01G 9/04* (2013.01); *H01G 9/048* (2013.01); *H01G 9/0425* (2013.01)

(58) Field of Classification Search
CPC   H01G 9/012; H01G 9/15; H01G 9/14; H01G 9/26; H01G 9/0425; H01G 9/048
See application file for complete search history.

(56) References Cited

U.S. PATENT DOCUMENTS

| | | | |
|---|---|---|---|
| 2008/0216296 A1* | 9/2008 | Prymak ................ | H01G 9/0029 29/25.03 |
| 2008/0273291 A1* | 11/2008 | Brenneman .......... | H01G 9/0029 361/523 |
| 2009/0161299 A1* | 6/2009 | Nemoto ............... | H01G 9/0425 361/532 |
| 2010/0020473 A1* | 1/2010 | Prymak ................. | H01G 9/012 361/523 |

* cited by examiner

*Primary Examiner* — Dion R Ferguson
(74) *Attorney, Agent, or Firm* — Li & Cai Intellectual Property (USA) Office

(57) ABSTRACT

A solid electrolytic chip capacitor is provided which comprises a substrate layer, an electrical insulating block, a conductive polymer layer, a patterned reinforcement layer, and an electrode layer. The electrical insulating block is formed on the substrate layer to define an anode region and a cathode region on the substrate layer. The conductive polymer layer is formed to cover the cathode region of the substrate layer. The patterned reinforcement layer is formed to cover the conductive polymer. The electrode layer is formed to cover the patterned reinforcement layer. Whereby, the mechanical strength of the chip solid electrolytic capacitor can be improved without loss of capacitance.

10 Claims, 8 Drawing Sheets

SOLID ELECTROLYTIC CHIP CAPACITOR AND MANUFACTURING METHOD THEREOF

BACKGROUND OF THE INVENTION

1. Field of the Invention

The instant disclosure relates to a solid electrolytic capacitor; in particular, to a solid electrolytic chip capacitor having high yield and reliability and a manufacturing method thereof.

2. Description of Related Art

With the rapid advancement of semiconductor processing technology, packaged electronic products follow the trend of miniaturization, high electrical performance, multi-function, high reliability, and RoHS Compliance. The wet electrolytic capacitor cannot meet the trend requirements of the electronic products, thus the development of the solid state electrolytic capacitor.

There are many different types of substrates that can be used for the solid-state electrolytic capacitor. Currently, aluminum and tantalum are the most commonly used materials for solid-state electrolytic capacitors. To increase capacitance, a plurality of solid-state electrolytic capacitors is laminated together in parallel to form a capacitor unit. Thus, a higher capacitance can be obtained, in which total capacitance is the sum of all values from all capacitor units.

Specifically, when stacking the capacitor units in a packaging process, two anode portions of the adjacent capacitor units are welded to each other. However, the thick anode portion of each capacitor unit almost always results in low welding quality and low welding success rate. Further, the maximum number of the stacked capacitor units is limited by the thick anode portion of each capacitor unit.

Moreover, in the welding process, molten aluminum can be readily produced and splattered when the thick anode portions of the capacitor units are grinded against each other. However, the molten aluminum may occupy only portions of empty space inside the package body after solidification. When the solidifying aluminum is melted twice in a solder reflow process, voids that are formed inside the package body can decrease airtightness. Thus, moisture can enter the package body that may affect electric properties of the capacitor units.

SUMMARY OF THE INVENTION

The object of the instant disclosure is to provide a solid electrolytic chip capacitor having high mechanical properties and high resistance to deformation to improve the above-mentioned disadvantages of the background art.

In order to achieve the aforementioned objects, according to an embodiment of the instant disclosure, the solid electrolytic chip capacitor comprises a substrate layer, an electrical insulating block, a conductive polymer layer, a patterned reinforcement layer, and an electrode layer. The electrical insulating block is formed on the substrate layer to define an anode region and a cathode region on the substrate layer. The conductive polymer layer is formed to cover the cathode region of the substrate layer. The patterned reinforcement layer is formed to cover the conductive polymer. The electrode layer is formed to cover the patterned reinforcement layer.

A manufacturing method of the solid electrolytic chip capacitor is further provided. According to an embodiment of the instant disclosure, the manufacturing method comprises: providing a substrate layer; forming an electrical insulating block on the substrate to define an anode region and a cathode region on the electrical insulating block; forming a conductive polymer layer to cover the cathode region of the substrate layer; forming a patterned reinforcement layer to cover the conductive polymer; and forming an electrode layer to cover the patterned reinforcement layer.

Base on the above, for the instant solid electrolytic chip capacitor, there is a patterned reinforcement layer arranged between the conductive polymer layer and the electrode layer Accordingly, compression on impact can be avoided, and the machining defects on the surfaces of the oxide film or the conductive polymer layer can be mended or repaired, thereby preventing the leakage current and the worsening of capacitance properties. For the instant manufacturing method of the solid electrolytic chip capacitor, the overall process can be simplified, and the processing cost and time can be reduced.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

The instant disclosure relates to a novel structural solid electrolytic chip capacitor. The main characteristic of the solid electrolytic chip capacitor is that the anode portion has a patterned reinforcement layer therein and a surface protective layer there-around, whereby the worsened capacitance properties caused by compression on impact in the packaging process can be avoided.

The aforementioned illustrations and following detailed descriptions are exemplary for the purpose of further explaining the scope of the instant disclosure. Other objectives and advantages related to the instant disclosure will be illustrated in the subsequent descriptions and appended drawings.

First Embodiment

Figure 1:
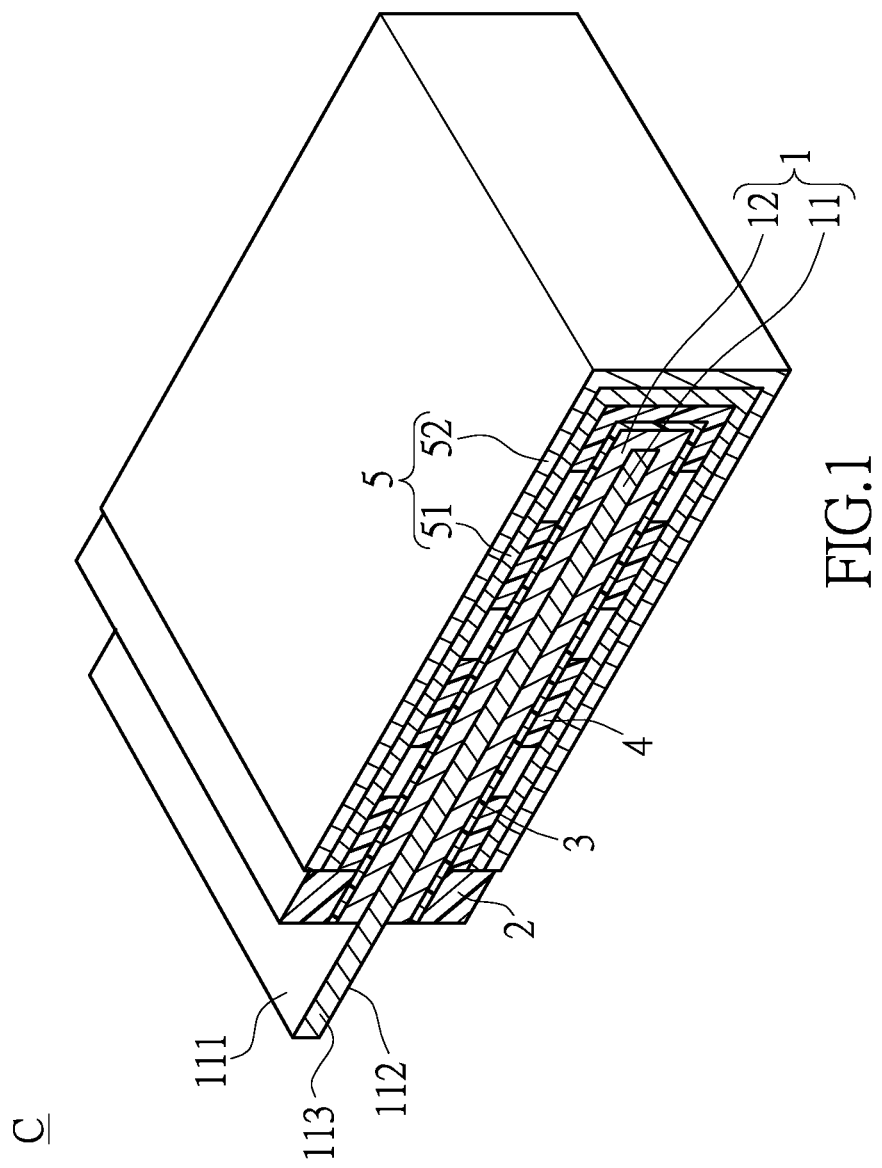
FIG. 1 is a three-dimensional view showing the solid electrolytic chip capacitor in accordance to the first embodiment of the instant disclosure.
Figure 2:
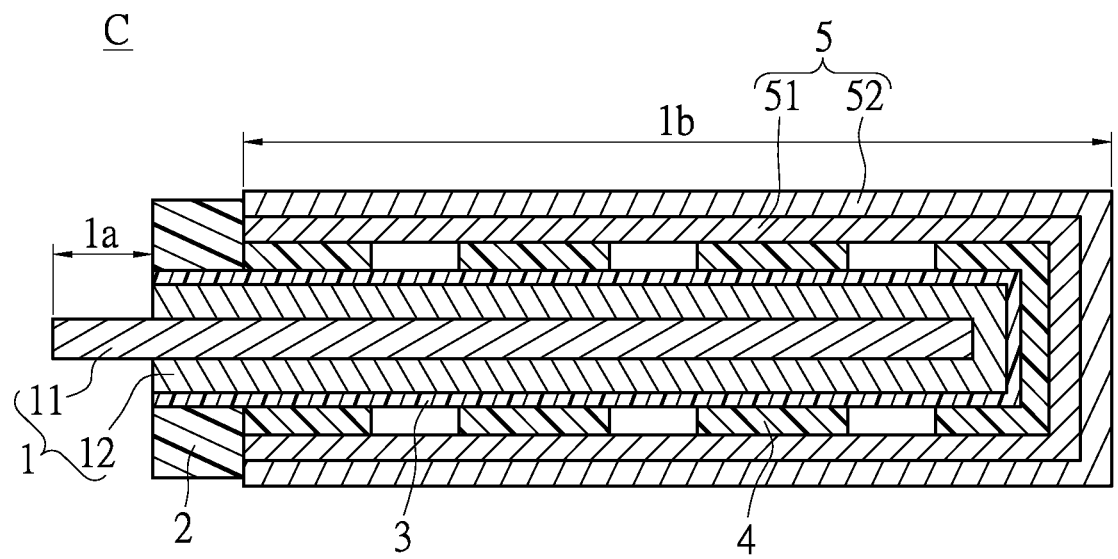
FIG. 2 is a cross-sectional view showing the solid electrolytic chip capacitor in accordance to the first embodiment of the instant disclosure.

Please refer to FIGS. 1-2. FIG. 1 is a three-dimensional view showing the solid electrolytic chip capacitor in accordance to the first embodiment of the instant disclosure, and FIG. 2 is a cross-sectional view showing the solid electrolytic chip capacitor in accordance to the first embodiment of the instant disclosure. The solid electrolytic chip capacitor C, as shown in the figures, comprises a substrate layer 1, at least one electrical insulating block 2, a conductive polymer layer 3, a patterned reinforcement layer 4, and an electrode layer 5.

The substrate layer 1 comprises a metal substrate 11 and an oxide film 12 coated on the metal substrate 11. The metal substrate 11 can be, but is not limited to, an aluminum foil body having a thickness in a range between 20 mm to 100 mm and a relatively high (more than 98 percent by weight) aluminum content. Please note that defects can be easily formed on the oxide film 12 coated upon the metal substrate 11 if it has a high impurity content, and these defects can cause current leakage.

The metal substrate 11 has a first surface 111, a second surface 112 opposite to the first surface 111, and a side surface 113 between the first and second surfaces 111, 112. Preferably, the first and second surfaces 111, 112 and the side surface 113 can be formed with a plurality of craters (not shown) to increase the effective area of the metal substrate 11 and, in turn, increase capacitance. For this purpose, a mechanical process, a chemical process, an electrochemical process, or a laser trimming process can be performed on the metal substrate 11. However, the craters on said surfaces can have a different geometry and a random distribution in accordance with the desired capacitor properties, which is not limited herein.

The oxide film 12 can be an aluminum oxide ($Al_2O_3$) film and covers the first and second surfaces 111, 112 and a portion of the side surface 113 (i.e. rear side surface) of the metal substrate 11. The oxide film 12 is configured to be a dielectric of the solid electrolytic chip capacitor C. It should be noted that a distance between the anode and the cathode of the solid electrolytic chip capacitor C can be defined by the thickness of the oxide film 12, thereby obtaining a desired tunable capacitance value. Specifically, since a thick oxide film 12 is formed on the metal substrate 11, the solid electrolytic chip capacitor C has a relatively low capacitance. Since a thin oxide film 12 is formed on the metal substrate 11, the solid electrolytic chip capacitor C has a relatively high capacitance.

On each of two opposite surfaces of the oxide film 12 there is arranged an electrical insulating block 2. The two electrical insulating blocks 2 can be made of an electrical insulating resin. One of the electrical insulating blocks 2 extends away from the first surface 111 of the metal substrate 11, and the other one of the electrical insulating blocks 2 extends away from the second surface 112 of the metal substrate 11. Thereby, an anode region 1a and a cathode region 1b can be defined on the substrate layer 1 so that the anode and cathode parts of the solid electrolytic chip capacitor C can be separated.

The conductive polymer layer 3 is formed to cover the surface of the oxide film 12 within the cathode region 1b of the substrate layer 1. For the instant embodiment, the conductive polymer layer 3 can be made of polythiophene (PT), polyacetylene (PA), polyaniline (PANI), or polypyrrole (PPy), preferably the conductive polymer layer 3 is made of polyethylene dioxythiophene (PEDOT), where the materials are not restricted thereto. Please note that the above-mentioned materials are all provided with functions of high conductivity, excellent heat resistance and temperature characteristics, strong affinity for adherence to dielectric layer without damaging it, and will not deteriorate under applied voltage. Thus, said materials are suitable to apply on solid-state electrolytic capacitors.

Referring now to FIGS. 3A to 6, as well as FIGS. 1 and 2, the patterned reinforcement layer 4 is formed to cover the conductive polymer 3. For the instant embodiment, the patterned reinforcement layer 4 can be made of an insulation material such as epoxy, silicon, or polyimide, where the materials are not restricted thereto. In various embodiments, the patterned reinforcement layer 4 can also be made of a conductive material such as carbon paste, silver paste, or any other suitable conductive paste.

Figure 3B:
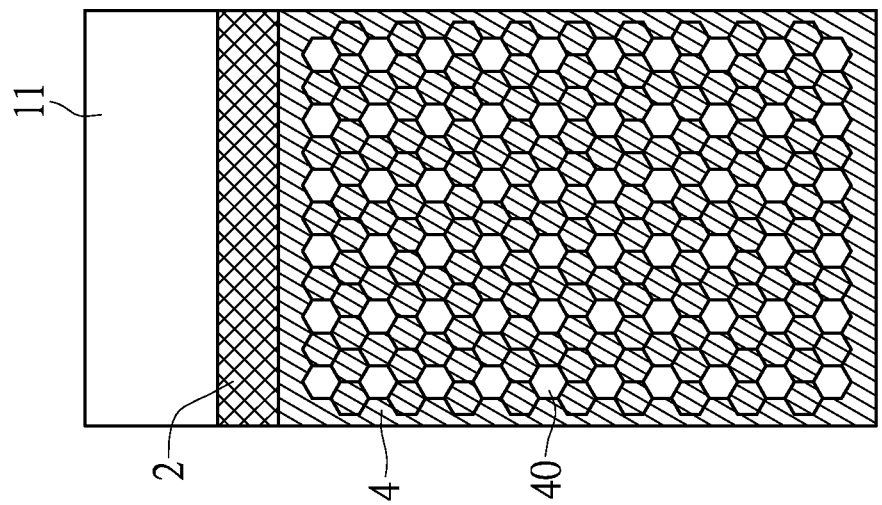
FIGS. 3A and 3B are schematic views showing a patterned reinforcement layer of the solid electrolytic chip capacitor in accordance to the first embodiment of the instant disclosure.
Figure 3A:
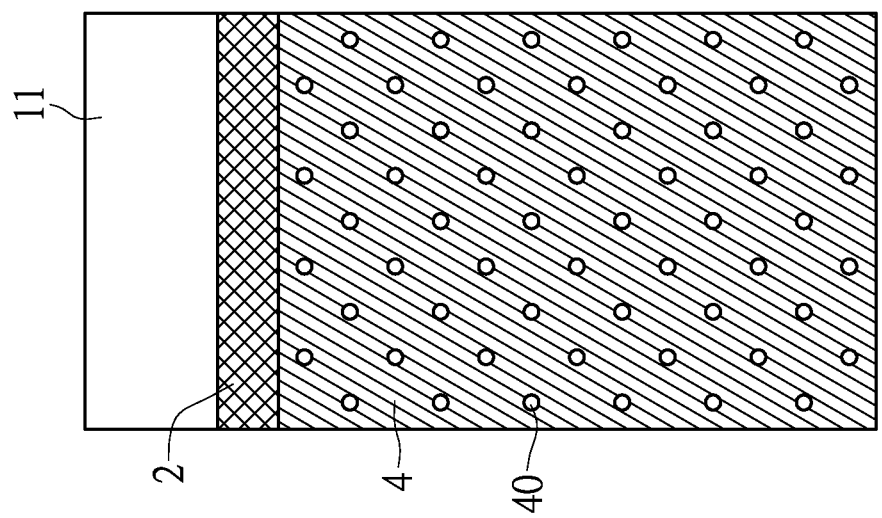
Figure 4:
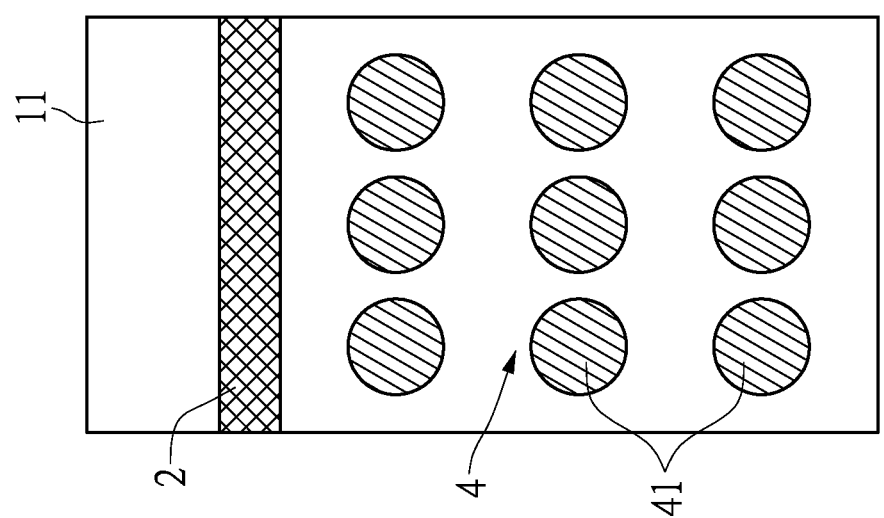
FIG. 4 is another schematic view showing the patterned reinforcement layer of the solid electrolytic chip capacitor in accordance to the first embodiment of the instant disclosure.

Further details on the structural characteristics of the patterned reinforcement layer 4 are as follows. One aspect the patterned reinforcement layer 4, as shown in FIGS. 3A and 3B, has a plurality of orifice holes 40 uniformly distributed thereon. The shapes of the orifice holes 40 can include circular, square, elliptical, honeycomb, and/or other geometric shapes. Another aspect the patterned reinforcement layer 4, as shown in FIG. 4, comprises a plurality of monolithic structures 41 arranged in a matrix. The shapes of the monolithic structures 41 can include O, X, Y, T, and/or other stereoscopic shapes.

Figure 5B:
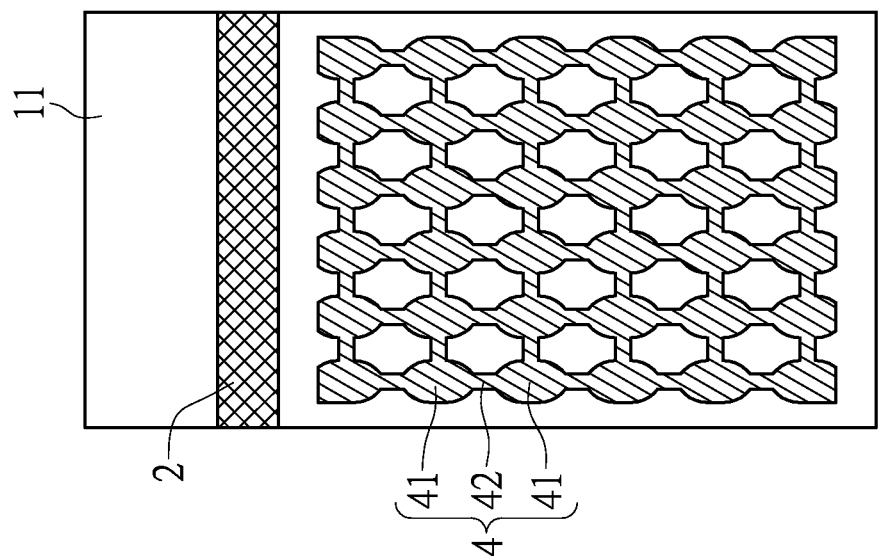
FIG. 5B is still another schematic view showing the patterned reinforcement layer of the solid electrolytic chip capacitor in accordance to the first embodiment of the instant disclosure.
Figure 5A:
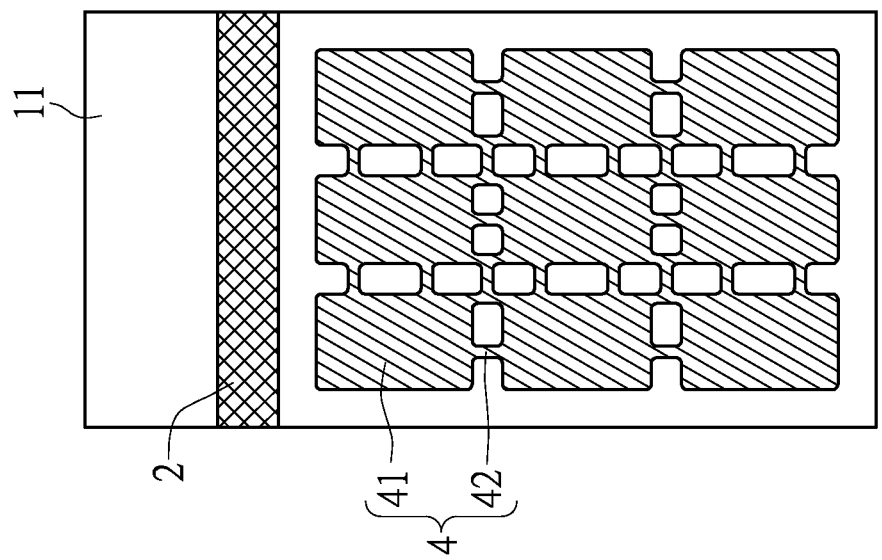
FIG. 5A is still another schematic view showing the patterned reinforcement layer of the solid electrolytic chip capacitor in accordance to the first embodiment of the instant disclosure.
Figure 6:
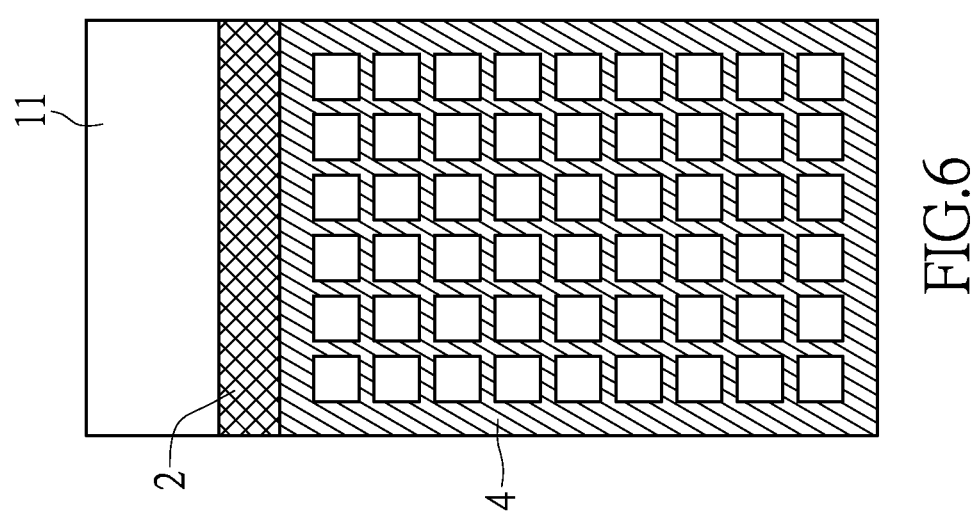
FIG. 6 is still another schematic view showing the patterned reinforcement layer of the solid electrolytic chip capacitor in accordance to the first embodiment of the instant disclosure.

Still another aspect of the patterned reinforcement layer 4, as shown in FIGS. 5A and 5B comprises a plurality of monolithic structures 41 and a plurality of connecting bridges 42. The monolithic structures 41 are arranged in a matrix, and there is at least one of the connecting bridges 42 positioned between the two adjacent monolithic structures 41. In other words, the patterned reinforcement layer 4 has a non-uniform distribution of random holes which are delimited by the monolithic structures and the connecting bridges. Still another aspect the patterned reinforcement layer 4, as shown in FIG. 6, is constituted by a net structure.

Referring back to FIGS. 1 and 2, the electrode layer 5 is formed to cover the patterned reinforcement layer 4 and configured to be a second electrode of the solid electrolytic chip capacitor C. For the instant embodiment, the electrode layer 5 can be a double-layered electrode layer consisting of a carbon paste layer 51 and a silver paste layer 52 coated on the carbon paste layer 51.

Second Embodiment

Figure 7:
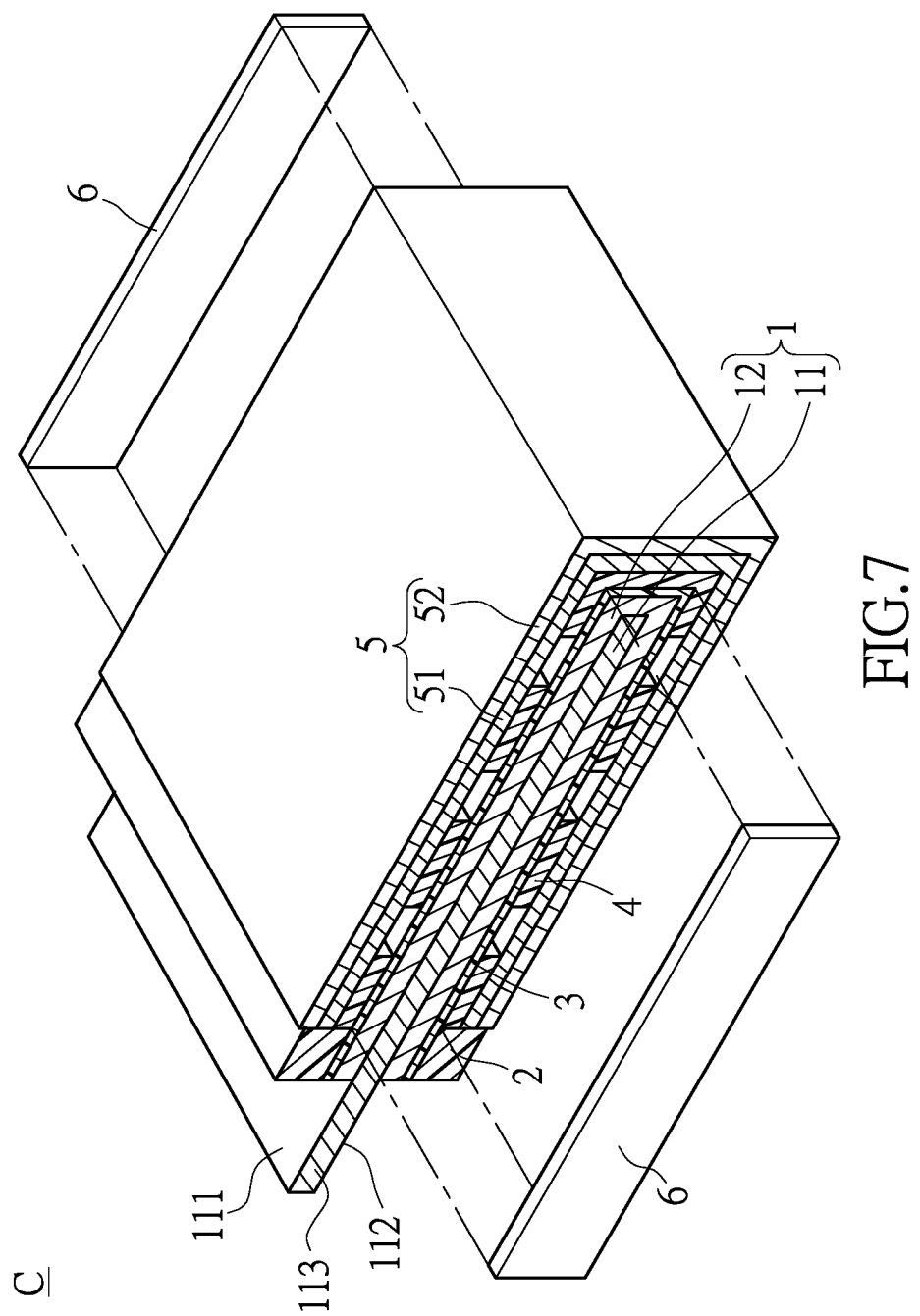
FIG. 7 is a three-dimensional view showing the solid electrolytic chip capacitor in accordance to the second embodiment of the instant disclosure.

Please refer to FIG. 7, which is a three-dimensional view showing the solid electrolytic chip capacitor in accordance to the first embodiment of the instant disclosure. The chip solid electrolytic capacitor C, as shown in the figures, comprises a substrate layer 1, at least one electrical insulating block 2, a conductive polymer layer 3, a patterned reinforcement layer 4, an electrode layer 5, and at least one surface protective layer 6. For the instant embodiment, the surface protective layer 6 can be formed from the overflowed patterned reinforcement layer 4 and made of an insulation material such as epoxy, silicon, or polyimide, however the materials are not restricted thereto. In various embodiments, the surface protective layer 6 can also be made of a conductive material such as carbon paste, silver paste, or any other suitable conductive paste.

The surface protective layer 6 can be configured to cover the exposed surfaces of the metal substrate 11 (aluminum core layer) to mend or repair the machining surface defects such as microcracks, fissures, or structurally deformed portions, thereby maintaining the capacitor properties for a long time. Moreover, the surface protective layer 6 can also be configured to enhance load-carrying capabilities of the peripheral edge of the aluminum core layer. Specifically, the surface protective layer 6 covers the exposed side surfaces (left and right side surfaces) of the metal substrate 11, the oxide film 12, and the conductive polymer layer 3. Accordingly, compression on impact caused by the package process can be prevented.

Figure 8:
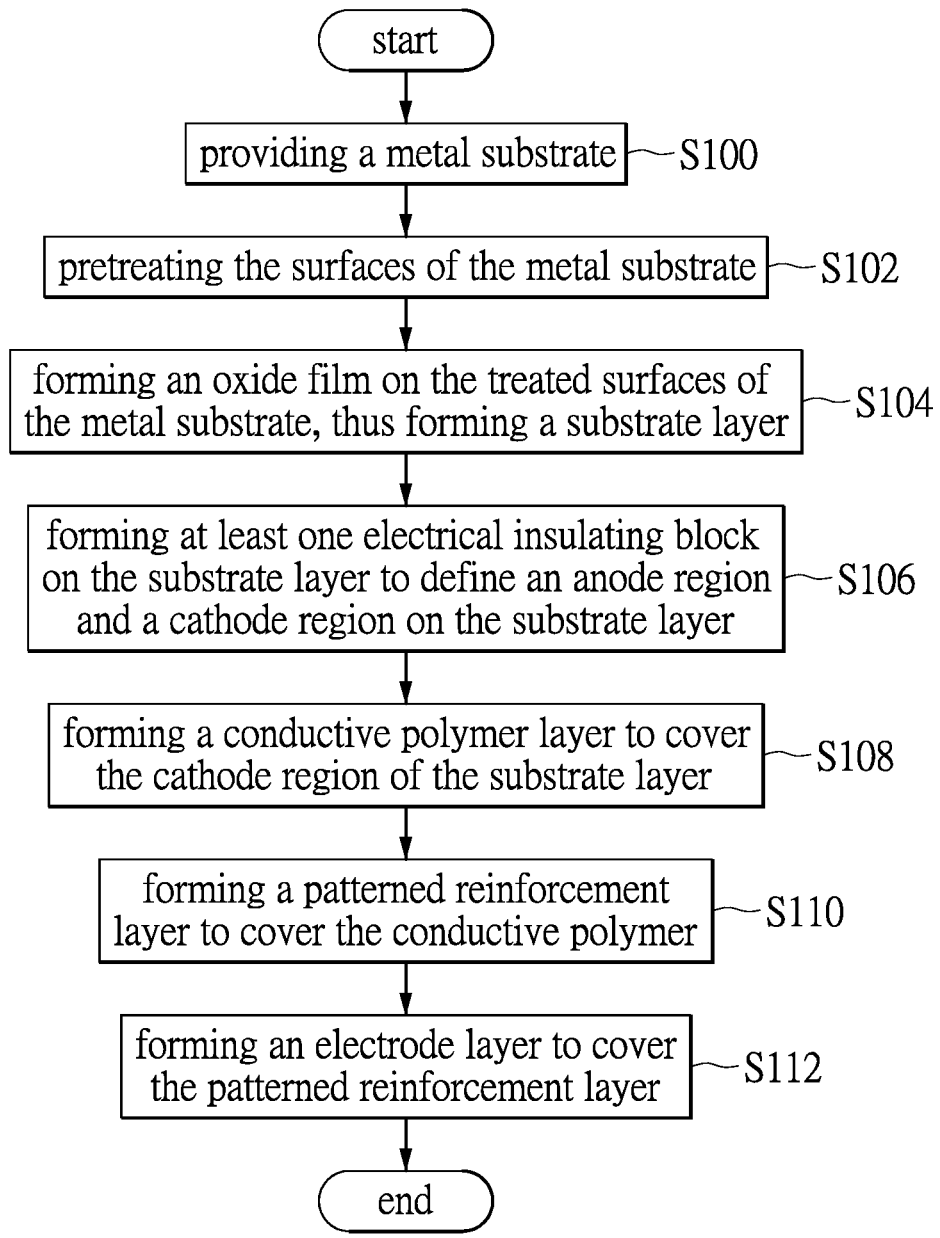
FIG. 8 is a process diagram of a manufacturing method of the solid electrolytic chip capacitor of the instant disclosure.

The structural characteristics of the solid electrolytic chip capacitor C are mentioned above. Referring now to FIG. 8, as well as the referring to FIGS. 1 and 2, the following will describe a method for manufacturing the solid electrolytic chip capacitor C.

The method firstly provides a metal substrate 11 having a first surface 111, a second surface 112 opposite to the first surface 111, and a side surface 113 between the first and second surfaces 111, 112 (step S100). Since the characteristics of the metal substrate layer 11 are mentioned above, it is therefore not described in more detail here.

The metal substrate 11 is then subjected to a surface treatment (step S102), where the surface treatment processes disclosed in the first embodiment can be used. For the mechanical process, a sanding or grinding tool (i.e. sandpaper) can be performed on the first and second surfaces 111, 112 and the side surface 113 of the metal substrate 11. Accordingly, the effective area of the metal substrate 11 can be increased approximately 1.5-3 times. For the chemical process, said surfaces of the metal substrate 11 can also be treated with a corrosion solution, i.e. hydrochloric acid, copper chloride, etc. Accordingly, the effective area of the metal substrate 11 can be increased approximately 1.5-7 times. For the electrochemical process, said surfaces of the metal substrate 11 can also be treated with a corrosion solution, i.e. hydrochloric acid, copper chloride, etc., under a predetermined AC/DC current flow. Accordingly, the effective area of the metal substrate 11 can be increased approximately 6-100 times. However, any suitable process (i.e. laser trimming process) for the corrosion of metal surfaces can be adapted for use in accordance with the desired capacitor properties, which is not limited herein.

Next, an oxide film 12 is formed on the corroded surfaces of the metal substrate 11 (step S104). In practice, an electrochemical treatment is carried out with organic acid or inorganic acid to form the oxide film 12 on the corroded surfaces of the metal substrate 11. After that, the preparation of the substrate layer 10 is finished.

Next, at least one electrical insulating block 2 is formed on the substrate layer 1, and configured to define an anode region 1a and a cathode region 1b on the substrate layer 1 (step S106). In practice, an insulation material is coated on a predetermined region on the oxide film 12, after the formation of the insulation material, the anode and cathode regions 1a, 1b can be separated by the electrical insulating block 2.

Next, a conductive polymer layer 3 is formed to cover the cathode region 1b of the substrate layer 1 (step S108). In practice, the substrate layer 1 with at least one electrical insulating block 2 can be dipped into a solution containing a conducting polymer, thus forming the conductive polymer layer 3.

Next, a patterned reinforcement layer 4 is formed to cover the conductive polymer 3. In practice, an insulation material or a conductive material can be formed on the conductive polymer 3 by screen printing, thus forming the patterned reinforcement layer 4. Accordingly, the transfer pattern size can be controlled precisely, and the processing cost and time can be reduced. It should be noted that a surface protective layer 6 can be formed from the overflowed patterned reinforcement layer 4. Finally, a carbon paste layer 51 is formed to cover the patterned reinforcement layer 4, and a silver paste layer is formed to cover the carbon paste layer 51.

In summary, for the instant solid electrolytic chip capacitor, there is a patterned reinforcement layer arranged between the conductive polymer layer and the electrode layer Accordingly, compression on impact can be avoided, and the machining defects on the surfaces of the oxide film or the conductive polymer layer can be mended or repaired, thereby preventing the leakage current and the worsening of the capacitance properties.

Moreover, there is formed a surface protective layer for the covering of the exposed surfaces of the metal substrate, thus to mend or repair the machining surface defects such as microcracks, fissures, or structurally deformed portions. Thereby, the capacitor properties can be maintained for a long time.

Further, since the patterned reinforcement layer has a high mechanical strength, and the surface protective layer can be used in turn to enhance load-carrying capabilities of the peripheral edge of the aluminum core layer, the instant solid electrolytic chip capacitor can have high yield and reliability.

In addition, for the instant manufacturing method of the solid electrolytic chip capacitor, the overall process can be simplified, and the processing cost and time can be reduced.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A solid electrolytic chip capacitor, comprising:
   a substrate layer;
   an electrical insulating block formed on the substrate layer to define an anode region and a cathode region thereon;
   a conductive polymer layer formed to cover the cathode region of the substrate layer;
   a patterned reinforcement layer formed to cover the conductive polymer; and
   an electrode layer formed to cover the patterned reinforcement layer.

2. The solid electrolytic chip capacitor according to claim 1, wherein the patterned reinforcement layer has a plurality of orifice holes uniformly distributed thereon.

3. The solid electrolytic chip capacitor according to claim 1, wherein the patterned reinforcement layer comprises a plurality of monolithic structures arranged in a matrix.

4. The solid electrolytic chip capacitor according to claim 3, wherein the patterned reinforcement layer comprises a plurality of connecting bridges, each of which is positioned between the two adjacent monolithic structures.

5. The solid electrolytic chip capacitor according to claim 1, wherein the patterned reinforcement layer is constituted by a net structure.

6. The solid electrolytic chip capacitor according to claim 1, wherein the substrate layer comprises a metal substrate and an oxide film, the metal substrate has a first surface, a second surface opposite to the first surface, and a side surface between the first and second surfaces, and the oxide film covers the first and second surfaces and a portion of the side surface.

7. The solid electrolytic chip capacitor according to claim 6, further comprises a surface protective layer formed from the overflowed patterned reinforcement layer, and the surface protective layer covers the exposed surfaces of the metal substrate, the oxide film, and the conductive polymer layer.

8. The solid electrolytic chip capacitor according to claim 1, wherein the metal substrate is a tantalum sintered body, an aluminum foil, or a niobium ingot, and the electrode layer comprises a carbon paste layer and a silver paste layer coated on the carbon paste layer.

9. The solid electrolytic chip capacitor according to claim 1, wherein the patterned reinforcement layer comprises insulation and conductive materials.

10. A manufacturing method of solid electrolytic chip capacitor according to claim 1, comprising the following steps:
   providing a substrate layer;
   forming an electrical insulating block on the substrate to define an anode region and a cathode region on the electrical insulating block;
   forming a conductive polymer layer to cover the cathode region of the substrate layer;
   forming a patterned reinforcement layer to cover the conductive polymer; and
   forming an electrode layer to cover the patterned reinforcement layer.

\* \* \* \* \*